United States Patent [19]

Germanaud et al.

[11] Patent Number: 5,055,213

[45] Date of Patent: Oct. 8, 1991

[54] ADDITIVES TO LUBRICANTS RESULTING FROM THE CONDENSATION OF AN ALKYLENE POLYAMINE WITH A COPOLYMER CONTAINING VICINAL CARBOXYLIC GROUPS

[75] Inventors: Laurent Germanaud, Heyrieux; Nguyen Truong-Dinh, Vallauris; Gilbert Marie, Pau; Patrick Turello, Francheville, all of France

[73] Assignee: Societe Nationale Elf Aquitaine, Courbevoie, France

[21] Appl. No.: 447,171

[22] Filed: Dec. 7, 1989

[30] Foreign Application Priority Data

Dec. 12, 1988 [FR] France .............................. 88 16336

[51] Int. Cl.$^5$ ........................................... C10M 105/08
[52] U.S. Cl. ............................ 252/51.5 A; 525/327.6; 525/375
[58] Field of Search ................................... 252/51.5 A

[56] References Cited

U.S. PATENT DOCUMENTS 3,048,544 8/1962 Stewart et al. ................ 252/51.5 A
3,933,761 1/1976 Coleman ........................ 252/51.5 A

FOREIGN PATENT DOCUMENTS 0171189 2/1986 European Pat. Off. .

*Primary Examiner*—Bernard Lipman
*Attorney, Agent, or Firm*—Burgess, Ryan & Wayne

[57] ABSTRACT

The invention relates to additives to lubricants resulting from the condensation of a primary or secondary amine and/or of an alkylene polyamine with a copolymer containing vicinal carboxylic groups.

Derivatives of phenothiazine, or naphthylamine and of diphenylamine are employed in most cases as alkylene polyamine.

These compounds can be employed as multifunctional additives to lubricants.

36 Claims, No Drawings

ADDITIVES TO LUBRICANTS RESULTING FROM THE CONDENSATION OF AN ALKYLENE POLYAMINE WITH A COPOLYMER CONTAINING VICINAL CARBOXYLIC GROUPS

BACKGROUND OF THE INVENTION

1. Field of the Invention

The present invention relates to polymeric compounds which can be employed as multifunctional additives to lubricants.

2. Description of the Related Art

It is known that lubricating oils, and in particular crankcase oils intended for internal combustion engines, contain various additives used to improve the performance of the said oils when in use. Certain additives are employed to increase the viscosity index of the oil, while others ensure, for example, that the crankcase is kept clean by suspending insoluble deposits, also known as sludge, which form in the oil.

The additives intended to improve the viscosity index of the oil must have, on the one hand, a sufficient thickening effect on a light lubricating oil at high temperatures in order that the lubricating properties of this oil may correspond to that of a heavier lubricating oil and, on the other hand, a limited thickening effect on a light lubricating oil at low temperatures to avoid disturbing the characteristics of the said oil at these low temperatures. They are generally long-chain polymeric compounds such as, for example, polyisobutenes, polymethacrylates, polyalkylstyrenes, partially hydrogenated butadiene and styrene copolymers and amorphous ethylene and propene copolymers.

The additives ensuring that the crankcase is kept clean are, on the one hand, detergents such as, for example, polyvalent metal sulphonates, phenates or organic phosphates, which are particularly effective during "hot" running, and, on the other hand, dispersants such as, for example, succinimides or succinic esters alkylated with an isobutene or propene polymer on the carbon alpha to the carbonyl of the succinimide, these additives working more particularly during "cool" running, which is that of motor vehicles which stop frequently.

There have also been proposed additives for lubricating oils, intended to ensure simultaneously the improvement in the viscosity index of the oils and the dispersion of the sludge which they may contain. Such compounds are, for example, obtained by introducing nitrogenous monomers either by copolymerization or by grafting onto a thickening polymer. The nitrogenous dispersant monomers are preferably chosen from maleimides, vinylimidazolines, vinylpyrrolidones, vinylpyridines or N,N-dialkylaminoethyl methacrylates. The following patents claim the use of such compounds: EP 171,167, EP 167,195, EP 164,807, EP 145,369, U.S. Pat. No. 4,606,834, U.S. Pat. No. 3,732,334, BE 874,068.

Nevertheless, in lubricants, multifunctional additives exhibiting properties other than viscosity improvers and dispersants are sought after. In particular, formulators increasingly look for additives exhibiting a high thermal stability and a high oxidation resistance because of the increasing severity of engine operating conditions. An increase in the working temperature of the lubricant is also observed, particularly in diesel engines subjected to high loads, where the temperature at the top of the piston, in the vicinity of the first groove, may reach or even exceed 350° C. Lubricants tend to oxidize when subjected to these high temperatures. This decomposition is proportional to the thermal stability and to the oxidation resistance of the oil and of the additives. It gives rise to the formation and to the deposition of resinous compounds and of carbonaceous substances on the piston walls. If these deposits become too great, they can initiate a gumming up or seizing of the piston and can increase the wear of the moving metal components. It is therefore important to control and to limit these deposits as much as possible by using additives which are effective and stable at high temperatures.

The protection of lubricating oils by means of antioxidant organic molecules is widely described in the prior art. A distinction is generally made among these compounds according to their mode of action: on the one hand, free radical inhibitors (hindered phenols, aromatic amines, phenothiazines, etc) and, on the other hand, products which destroy peroxides (metal dithiophosphates or dithiocarbamates).

There are also known metal deactivators such as, for example, mercaptobenzothiazole, which protect the lubricants from the catalytic oxidation of metal ions such as cuprous or cupric ions. These compounds act by passivating the surfaces or by chelating the metals present in the oil.

The use of antioxidant molecules of low molecular weight can present a number of disadvantages; in particular, the solubility of these products in oil is limited and they are sometimes volatile or capable of subliming when the motor operates in conditions close to its maximum output.

These disadvantages can be eliminated by employing viscosity-improving polymers which carry antioxidant functional groups. Another advantage of these multifunctional polymers is that they concentrate the antioxidant structures carried by the polymer in the upper parts of the engine during "flash" evaporations of the oil, where the protection against oxidation is most needed.

Viscosity-improving and antioxidant polymers are known in the prior art.

U.S. Pat. No. 4,500,440 claims an ethylene-propylene copolymer carrying epoxide functional groups obtained by grafting glycidyl methacrylate and treated with 5-aminotetrazole.

European Patent Applications 199,453 and 20,164 describe the introduction of molecules with an antioxidant effect, such as phenothiazine, or Schiff bases formed from aldehydes and nitrogenous heterocyclic rings such as pyrrolidine, morpholine or piperazine with ethylene-propylene copolymers. Both these patents describe processes for the preparation of antioxidant polymers involving a stage of grafting the antioxidant monomer in the presence of free radical initiators.

This process exhibits two major disadvantages: on the one hand, the antioxidant monomer can, on account of its functional group, react with peroxides and, on the other hand, can form homopolymers. Both these secondary reactions give rise to the formation of by-products which cannot be employed and are difficult to separate.

European Patent Application 274,589 describes the preparation of lubricating compositions by condensing mixtures of phenothiazine and N-methylpiperazine with copolymers of methacrylic esters and of maleic anhydride. This synthesis is limited by the low reactivity of phenothiazine. A large quantity of unreacted phenothiazine remains dispersed in the polymer concentrate and can subsequently produce deposits in the engine.

SUMMARY OF THE INVENTION

We have now found a group of polymeric compounds which can be employed as multifunctional additives to lubricants and which does not have this disadvantage. These compounds improve the viscosity of lubricants while acting as a dispersant and antioxidant.

The polymeric compounds which can be employed as multifunctional additives for lubricants result from the condensation of a primary or secondary amine and/or of an alkylene polyamine of general formula

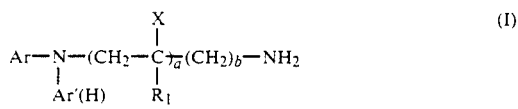

where

Ar and Ar' are identical or different aromatic radicals, it being possible for Ar' to be replaced by a hydrogen atom, or else Ar and Ar' are linked together to form a heterocyclic structure with the nitrogen to which they are attached $R_1$ is a hydrogen atom, a $C_1-C_{18}$ linear or branched alkyl radical, preferably the methyl radical or an aromatic radical, preferably a phenyl radical X is a hydrogen or halogen atom or else an OH or $NH_2$ group a and b are integers, a is between 0 and 5, preferably between 0 and 1 b is between 0 and 6, and preferably 0 and 3 and the sum $a+b$ is $\geq 1$, with a copolymer containing vicinal carboxylic groups and whose weight-average molecular mass is $\geq 20,000$.

DESCRIPTION OF THE PREFERRED EMBODIMENTS

The alkylene polyamine of general formula I may be, for example, an aminoalkyl derivative of naphthylamine, of diphenylamine, of aminodiphenylamine and of aminophenothiazine. One of its nitrogen atoms forms part of a heterocyclic ring in the case, for example, of aminoalkyl derivatives of phenothiazine, of imidazole, or benzimidazole, of triazole and of benzotriazole.

The alkylene chain of the alkylenepolyamines (I) is preferably an ethylene, 1,2-propylene or 1,3-propylene chain or a 1,3-propylene chain with a halogen, hydroxyl or amine substituent in position 2.

Phenothiazine, naphthylamine and diphenylamine derivatives are employed in most cases, and more particularly 10-aminopropylphenothiazine, amino-3-propylaminophenothiazine, N-aminopropyl-2-naphthylamine and N-aminopropyldiphenylamine.

The primary or secondary amine may be an aliphatic or aromatic mono- or polyamine. The reactive nitrogen may form part of a heterocyclic ring.

By way of example there may be mentioned N,N-dimethylaminoethylamine, N,N-dimethylaminopropylamine, N-methylpiperazine, N-aminoethylpiperazine, N-hydroxyethylpiperazine, morpholine, N-aminopropylmorpholine, 5-aminotetrazole and 2-aminopyrimidine.

The copolymer containing vicinal carboxylic groups is obtained by copolymerization or grafting of an unsaturated alpha,beta-dicarboxylic acid in diacid or anhydride form.

A maleic anhydride derivative is generally employed, such as maleic anhydride itself, chloromaleic anhydride or itaconic anhydride.

In the case of synthesis by direct copolymerization, the unsaturated alpha, beta-dicarboxylic acids are copolymerized with at least one ester of a monoacid or of an unsaturated diacid. These esters are generally chosen from (meth)acrylates, maleates or fumarates esterified with $C_1-C_{22}$ alcohols. Examples which may be mentioned are methyl, ethyl, n-butyl, 2-ethylhexyl, octyl, decyl, dodecyl, n-tetradecyl, n-hexadecyl or n-octadecyl (meth)acrylates.

An industrial mixture of a number of alkyl (meth)acrylates which have variable chain lengths will be advantageously employed. If the number of carbon atoms in the alkyl chains is between 6 and 15 and preferably between 8 and 13, the copolymer has a good thickening power and endows the oil with good behaviour at low temperature.

The copolymer may contain other monomers, such as nitrogenous monomers and/or olefinic monomers.

The nitrogenous monomer which may form part of the composition of the copolymer preferably corresponds to the general formula:

$$CH_2=CR_2-CO-Y-R_3-NR_4R_5 \qquad (II)$$

where $R_2$ is the hydrogen atom or the methyl radical,

Y denotes an oxygen or sulphur atom or the —NH— group $R_3$ is a $C_2-C_6$ alkylene group, and $R_4$ and $R_5$, which are identical or different, are alkyl, cycloalkyl, alkylaryl or aryl radicals. They are preferably methyl and ethyl radicals.

As examples of nitrogenous monomers (II) there may be mentioned N,N-dimethylaminopropylmethacrylamide, N,N-diethylaminopropylmethacrylamide, N,N-dimethylaminoethylmethacrylamide, N,N-diethylaminoethylmethacrylamide, N,N-dimethylaminoethyl methacrylate or N,N-diethylaminoethyl methacrylate.

However, other nitrogenous monomers, such as vinylpyridines or vinylpyrrolidones, are also suitable.

The olefinic monomer which may form part of the composition of the copolymers of the invention corresponds to the general formula $$CH_2=CZ_1Z_2 \qquad (III)$$

where $Z_1$ and $Z_2$, which are identical or different, denote hydrogen, a saturated, unsaturated or aromatic $C_1-C_{30}$ hydrocarbon radical, an —O—CO—R' group (where R' is a $C_1-C_3$ alkyl radical), an —OR" group (where R" is a $C_1-C_{12}$ alkyl radical) or a halogen such as fluorine, chlorine or bromine.

The incorporation of the unsaturated alpha,beta-dicarboxylic compounds into the copolymer is made easier by the presence of the olefinic monomer. Among the olefinic monomers there may be mentioned ethylene, alphaolefins, vinyl chloride, 1,1-dichloroethylene, styrene or its derivatives, vinyl ethers such as methyl vinyl ether and vinyl esters such as vinyl acetate or propionate. The preferred olefinic monomers are ethylene, styrene and vinyl acetate. Styrene is advantageously employed.

The copolymers according to the invention contain 20 to 99% by weight and preferably 70 to 95% of (meth)acrylic esters, 0.1 to 10%, preferably 1 to 8%, of maleic anhydride, 0 to 10%, preferably 1 to 8%, of an olefinic monomer and 0 to 10%, preferably 1 to 7%, of a nitrogenous monomer.

The weight-average molecular mass of these copolymers is between 20,000 and 500,000 and preferably between 50,000 and 200,000.

The copolymer may also be prepared by grafting an unsaturated alpha,beta-dicarboxylic acid onto a hydrocarbon polymer or a poly(meth)acrylate.

Among these unsaturated acids those generally employed are maleic anhydride derivatives such as maleic anhydride itself, chloromaleic anhydride or itaconic anhydride. Maleic anhydride will be advantageously employed because the grafting takes place in mild conditions without formation of homopolymers as byproducts.

The hydrocarbon polymer may be chosen from ethylene copolymers, diene homo- and copolymers and alpha-olefin homopolymers.

The preferred hydrocarbon polymers are ethylene copolymers. They generally contain from 15 to 90% and preferably from 25 to 80% by weight of ethylene and 0 to 20% by weight of an unconjugated diene, the remainder originating from at least one $C_3$–$C_{24}$ alpha-olefin.

The linear or cyclic unconjugated dienes are generally chosen from 1,4-hexadiene, 2-methyl-1,4-pentadiene, 1,4-cyclopentadiene, 1,5-cyclooctadiene and norbornene derivatives such as 5-methylene-2-norbornene.

Among the alpha-olefins there may be mentioned propylene, butene, pentene, heptene, octene, nonene, decene, 4-methylpentene and 5-methylpentene. The ethylene copolymers generally contain from one to three of these alpha-olefins.

Among ethylene copolymers, ethylene-propylene copolymers are preferably employed.

These copolymers are substantially amorphous and they have a weight-average molecular mass of between 20,000 and 500,000, preferably between 50,000 and 200,000 and a polydispersity of less than 10, preferably less than 4.

The diene copolymers are prepared by copolymerization of two diolefins such as butadiene, isoprene or 2,2-dimethylbutadiene or the copolymerization of a diolefin with styrene.

As examples of diene copolymers there may be mentioned butadiene-styrene or butadiene-isoprene copolymers. These copolymers are preferably employed in a hydrogenated form to reduce the olefinic unsaturation and consequently their sensitivity to oxidation.

Among the diene homopolymers there may be mentioned the polymers of butadiene, of isoprene or of 2,3-dimethylbutadiene.

The alpha-olefin homopolymers are derived from alpha-olefins containing at least four carbon atoms. Among these homopolymers, polyisobutylene is the most important one.

The poly(meth)acrylates are generally prepared by polymerization of a mixture of $C_1$–$C_{21}$ esters of (meth)acrylic acid.

Both the hydrocarbon polymers and the poly(meth)acrylates may contain nitrogenous monomers such as the monomers corresponding to the general formula (II) or else other monomers such as vinylpyridines or vinylpyrrolidones.

The polyalkylenediamines of general formula (I) may be prepared by any of the methods known in the prior art. Thus, N-aminopropylphenothiazine is prepared by condensing phenothiazine with acrylonitrile in cyanoethylation conditions with a quantity of acrylonitrile which is greater than the theoretical quantity in the presence of an alkaline catalyst such as Triton B (benzyltrimethylammonium hydroxide) in methanolic solution, as described by N. L. Smith (J. Org. Chem. 15, 1129, 1950). The intermediate is then reduced to N-aminopropylphenothiazine by catalytic hydrogenation in an autoclave under hydrogen and ammonia pressure or by chemical reduction with a hydride, as suggested by French Patent 2,165,797.

Replacement of acrylonitrile with acrylamide, chloroacetamide, iodoacetamide or 3-chloropropionitrile gives analogous phenothiazine derivatives.

The copolymerization of the unsaturated alpha,beta-dicarboxylic acid with the unsaturated esters and, optionally, the other monomers is carried out according to the conventional methods of polymerization by a radical route in solution, in the presence of a radical initiator of the azobisisobutyronitrile or peroxide type, such as benzoyl or lauroyl peroxide and of a chain transfer agent such as dodecyl mercaptan. The solvent may be an aromatic solvent such as toluene or xylenes or a mineral or synthetic oil of the same kind as that to which the polymer is to be added. Approximately 0.01 to 0.32 moles of unsaturated acid, 0.7 to 0.99 moles of ester, 0 to 0.3 moles of nitrogenous monomer and 0 to 0.32 moles of olefinic monomer are employed.

The quantity of solvent will be generally such that the solids content by weight at the end of the reaction is between 30 and 70% and preferably approximately 50%.

The reaction is carried out at a temperature of between 40° and 140° C. and preferably between 80° and 120° C. Depending on the operating conditions, the reaction time may vary from 2 to 10 hours, preferably 3 to 5 hours.

The copolymer is obtained in the form of a viscous solution.

Any known method for fixing an unsaturated monomer onto a polymeric structure may be employed for grafting the unsaturated alpha,beta-dicarboxylic acid onto a hydrocarbon polymer or a poly(meth)acrylate. The polymer is generally dissolved in a hydrocarbon solvent. This solution, to which a free-radical generator has been added, is heated to the grafting temperature and kept at this temperature for a sufficient time to form active sites on the copolymer. The unsaturated acid, preferably maleic anhydride, is added in a suitable quantity. 0.1 to 20% by weight and preferably 1 to 10% by weight of unsaturated alpha,beta-dicarboxylic acid are generally employed relative to the hydrocarbon polymer.

The graft polymer may subsequently be isolated by solvent evaporation. The graft polymer can also be prepared in an oil. It is then unnecessary to isolate the polymer, which is collected in the form of a concentrated solution in the oil to which the primary amine will be added.

The grafting of maleic anhydride onto an olefinic polymer in a solvent phase is described in U.S. Pat. Nos. 4,144,181 and 4,137,185, while U.S. Pat. No. 3,862,265 and British Patents 1,119,629, 857,797 and 832,193 describe a process for grafting in the absence of solvent by kneading in the presence or absence of oxygen.

To inhibit the crosslinking reactions during the grafting, U.S. Pat. No. 4,160,072 and European Patent Application 171,167 recommend the use of chain transfer agents, such as mercaptans, in combination with radical promoters.

The condensation of the copolymer containing vicinal carboxylic acid functional groups with the alkylene polyamine of general formula (I) is carried out in an organic solvent or in an oil at a temperature of between 90° and 170° C. for 3 to 8 hours. 0.5 to 2, preferably 1, mole of alkylene polyamine is generally employed per vicinal carboxylic acid functional groups of the polymer. If the alkylene polyamine is employed as a mixture with a primary or secondary amine, 0.2 to 1 mole of the latter is generally employed per mole of polyamine of general formula (I).

It is possible to envisage reacting alkylene polyamines of general formula (I) with polymers containing carboxylic acid functional groups which are not vicinal but isolated. However, the degree of incorporation of the polyamines remains lower.

The concentration of the products thus obtained in the lubricating compositions which are ready for use is generally of the order of 0.2 to 15% and preferably from 1 to 10% by weight.

However, higher concentrations, for example 15 to 50%, may be envisaged when the lubricating composition is in the form of a concentrate to be diluted at the time of use.

The additive may be incorporated in natural or synthetic lubricating oils or mixtures of such oils. By way of example there may be mentioned ordinary or refined mineral oils of paraffinic or naphthenic composition and hydrorefined oils. Synthetic oils, such as polybutenes, alkylbenzenes such as dinonylbenzene and tetradecylbenzene, polypropylene glycol ethers or esters, polycarboxylic acid esters such as methyl adipate and pentaerythritol heptanoate, silicone oils such as polysiloxanes, complete or partial esters of phosphoric acid, especially tricresyl phosphate, and alkylphosphoric acids are also suitable.

The polymeric compounds according to the invention may be combined with other conventional additives for lubricants, such as corrosion inhibitors, detergents and antiwear, dispersant and antifoam additives.

The lubricating compositions containing the polymeric compound according to the invention can be employed especially as crankcase oils intended for internal combustion engines, as differential casing oils, as gear oils and to facilitate machining of metals.

The following examples illustrate the invention without, however, limiting it.

EXAMPLE I a) Preparation of N-aminopropylphenothiazine 2.5 ml of a 40% strength methanolic solution of benzyltrimethylammonium hydroxide are added dropwise to a reactor containing 100 g (0.5 moles) of phenothiazine and 530 g (10 moles) of acrylonitrile and cooled to a temperature below 10° C. The whole is heated to 80° C. for 1 hour 30 min. The excess acrylonitrile is removed by vacuum distillation. The solid is recrystallized twice from acetone. 10-Phenothiazinylproprionitrile is obtained in a 66% yield (83.9 g). M.p.: 156°-157° C.

50.6 g of this product are placed in a Soxhlet and are extracted continuously with 1000 ml of ether containing 16 g of lithium aluminium hydride. After 72 hours' reaction, the ether solution is treated successively with 16 ml of water, 12 ml of 25% strength sodium hydroxide and twice with 50 ml of water. After filtration of the insoluble salts, N-aminopropylphenothiazine is obtained after drying and distilling off the ether (70% yield).

b) Preparation of the copolymer

The following reactants are introduced with mechanical stirring into a reactor fitted with a condenser and an inert gas inlet:

| | |
|---|---|
| Methyl methacrylate | 9.02 g (0.0902 moles) |
| Lauryl methacrylate | 137.46 g (0.5412 moles) |
| Stearyl methacrylate | 60.98 g (0.1804 moles) |
| Maleic anhydride | 4.42 g (0.0451 moles) |
| Styrene | 4.69 g (0.0451 moles) |
| Hexane | 40 ml |
| Toluene | 40 ml |
| Dodecanethiol | 0.131 g |
| 150 Neutral Solvent mineral oil | 39.58 g |

These are heated to 80°-83° C. for 1 hour while a stream of nitrogen is passed through; 0.384 g of azobisisobutyronitrile (AIBN) are then introduced. The temperature rises to 92° C. and then stabilizes at about 83°-85° C. This temperature is maintained for 3 hours.

0.050 g of AIBN catalyst are added again and the mixture is heated to 100° C. for 1 hour. Another 0.025 g of AIBN and 144.7 g of 150NS mineral oil are added and the mixture is kept at 100° C. for 1 hour. The solvent is then evaporated off by vacuum distillation. A solution of a copolymer is then obtained at a concentration of 54% in mineral oil ($n_D^{20} = 1.480$, viscosity at 20° C. = 89Pa s.

c) Condensation of the amine with the copolymer 49.55 g of the copolymer solution prepared in 1b and 460 ml of toluene are introduced into a 500-ml conical fitted with a Dean Stark. A solution of 1.4 g of N-aminopropylphenothiazine (Ia) in 58 ml of toluene is added dropwise. These are heated to 110° C. for 5 hours and then to 160° C. for 1 hour while the toluene is distilled off. 5.37 g of 150 NS mineral oil are then added and the solvent is evaporated off under vacuum.

IR spectroscopy shows the disappearance of the anhydride bands (1785 cm$^{-1}$) and the appearance of the imide band (1705 cm$^{-1}$).

A solution of a copolymer is thus obtained at a concentration of 50% of active substance in a 150 NS mineral oil, containing $1.28 \times 10^{-4}$ moles of phenothiazine per g and constituting additive I.

EXAMPLE II

Grafting of maleic anhydride onto an ethylene-propylene copolymer 40 g of ethylene-propylene copolymer (Total EP 2590 - 50% by weight polypropylene, weight molecular mass of approximately 100,000) are "melted" for at least 15 min at 120° C. in the kneading chamber of an apparatus of Brabender-Plasticorder type, fitted with counter-rotating screws rotating at a speed of 40 revolutions/min. 6.7 g of maleic anhydride are dry-blended with 2 g of octadecanamide employed as an inhibitor of formation of insoluble products, and are then added progressively in small quantities to the "molten" mixture. A device enables the kneading chamber to be closed and thus makes it possible to avoid the loss of maleic anhydride by sublimation.

The peroxide is then added in several lots: 0.6 g of dicumyl peroxide every 5 minutes for 30 minutes (3.6 g in all). The reaction is finished off by being left at 120° C. for another 15 min, with a gentle stream of nitrogen which allows the ungrafted anhydride to be removed.

The degree of grafting is 2%. It is determined by reacting the graft polymer with excess octylamine in a toluene medium, followed by determining the unreacted octylamine with an alcoholic solution of hydrochloric acid.

The graft polymer is perfectly soluble in xylene, toluene and 150N and 200N oils.

b) Condensation of N-aminopropylphenothiazine 40 g of maleized copolymer from the preceding test are dissolved at 120° C. in 360 g of 150 NS oil and 300 g of 200NS oil in a 1-liter reactor fitted with a Dean-Stark, with stirring for at least 10 hours.

The mixture is cooled to 90° C.; 2.10 g of N-aminopropylphenothiazine of Example Ia, dissolved in 60 cm$^3$ of acetone, are then added. The reaction is maintained at this temperature for 1 hour and then at 130° C. for at least 3 hours under a gentle stream of nitrogen.

The solution obtained contains 5.7% of modified polymer and 0.3% of phenothiazine ($0.12 \times 10^{-4}$ moles per g of solution). A solution containing 1% of this modified polymer in the 150NS and 200NS oils has a viscosity of $99.2 \times 10^{-6}$ m$^2$/s and $12.9 \times 10^{-6}$ m$^2$/s at 40° and 100° C. respectively.

The thermal stability tests described in Example IV were carried out on the crude solution containing 5.7% of polymer (III.1) and the dilute solution containing 1% of polymer (III.2).

EXAMPLE III

Comparative 128 g of the polymer solution prepared in 1a and 325 ml of toluene are poured into a 500-ml conical fitted with a Dean Stark; 1.47 g of dimethylaminopropylamine are added dropwise. These are refluxed for 4 hours under nitrogen until water is no longer being formed.

A solution of a copolymer is then obtained, at a concentration of 54.4% of active substance in 150 Neutral Solvent mineral oil and constituting additive II (viscosity at 20° C. = 107Pa s).

EXAMPLE IV

Comparative 31.3 g of the copolymer solution prepared according to Example Ib, 70 ml of xylene and 0.7 g of phenothiazine are introduced in succession into a 100-ml conical fitted with a Dean Stark and with a condenser. The whole is heated to reflux with stirring for 8 hours. After distilling off the solvent, heating is maintained at 165°-170° C. for another 10 hours. After reaction, the degree of functionalization of the anhydride groups of the polymer, determined by infrared spectroscopy, is equal to only 14%.

EXAMPLE V

Comparative

The operation is carried out as in Example IV, but with the addition of 0.2 g of morpholine. After reaction, the degree of grafting determined as above remains below 70%.

EXAMPLE VI

The thermal stability of the polymer solutions of the examples of the invention is evaluated by differential calorimetric analysis. A 2-mg sample of a polymer solution is heated by establishing a temperature rise of 5° C./min and under a flow rate of 5 liters of oxygen per hour.

The starting temperature at which a thermal phenomenon indicating an onset of polymer oxidation appears is recorded. The higher this temperature, the more stable the polymers are thermally.

TABLE I

|  | Oxidation onset T °C. |
|---|---|
| Polymer Example Ia (comparative) | 176 |
| Polymer Example Ib | 230 |
| Polymer Example II (comparative) | 159 |
| Polymer Example III$_1$ | 270 |
| Polymer Example III$_2$ | 234 |

EXAMPLE VII

The oxidation stability of lubricating compositions containing a polymeric additive of the invention is evaluated in this example.

The tests are performed at 160° C. using a bomb pressurized with oxygen in the presence of a metal catalyst, a combustion catalyst and water, so as partly to simulate the conditions to which the oil can be subjected in a petrol engine.

The metal catalyst is a mixture of oil-soluble Pb, Cu, Fe, Mn and Sn naphthenates.

The oxidation stability of the lubricants is assessed by measuring the induction time, that is to say the time between the beginning of the test and the beginning of the rapid drop in pressure in the bomb. The longer the time, the more the lubricating compositions are protected against oxidation.

TABLE II

|  | Viscosity at 100° C. $10^{-6}$ m$^2$/s | Induction time (min) |
|---|---|---|
| Reference lubricant A (1) – 3.3 commercial polymer (2) | 11.57 | 122 |
| Reference lubricant A – 6.7% commercial polymer (2) | 17.84 | 124 |
| A – 5% Example I additive | 11.80 | 130 |
| A – 10% Example I additive | 17.60 | 145 |
| A – 10% polymer II | 20.80 | 117 |

(1) = ELF 15 W 30 grade lubricant
(2) = Viscoplex 51-64 from Rohm GmbH.

I claim:

1. Lubricating compositions containing a major proportion of at least one additive resulting from the condensation of at least one primary amine, secondary amine or of an alkylene polyamine of general formula

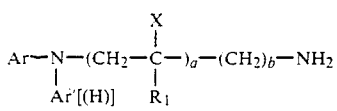

$$Ar-N-(CH_2-\underset{R_1}{\underset{|}{C}}-)_a-(CH_2)_b-NH_2 \quad (I)$$
$$\underset{Ar'[(H)]}{|}$$

wherein
wherein Ar and Ar' are linked together to form a heterocyclic structure with the nitrogen to which they are attached
$R_1$ is a hydrogen atom, a $C_1-C_{18}$ linear or branched alkyl radical, or an aromatic radical
X is a hydrogen atom, halogen, OH or $NH_2$ group
a and b are integers,
a is between 0 and 5
b is between 0 and 6, and the sum $a+b \geq 1$, with a copolymer containing maleic anhydride groups and whose weight-average molecular mass is $\geq 20,000$ and wherein said condensation is effected through an amine group.

2. Lubricating compositions according to claim 1, wherein $R_1$ is the methyl radical.

3. Lubricating compositions according to claim 1, wherein $R_1$ is the phenyl radical.

4. Lubricating composition according to one of claims 2, 3 or 1, characterized in that a is between 0 and 1.

5. Lubricating compositions according to one of claims 2, 3 or 1, wherein b is between 0 and 3.

6. Lubricating compositions according to claim 1, wherein in the general formula (I) $a=0$ and $b=2$.

7. Lubricating compositions according to claim 1, wherein in the general formula (I) $a=1$, $X=H$, $R_1=CH_3$ and $b=0$.

8. Lubricating compositions according to claim 1, wherein in the general formula (I) $a=0$ and $b=3$.

9. Lubricating compositions according to claim 1, wherein in the general formula (I) $a=1$, $b=1$, $R=H$ and X is a halogen or an OH or $NH_2$ group.

10. Lubricating compositions according to one of claims 2, 3 or 1, characterized in that in the general formula (I) Ar and Ar' are linked together to form the phenothiazinyl radical together with the nitrogen to which they are attached.

11. Lubricating compositions according to claim 10, wherein the alkylene polyamine of general formula (I) is 10-aminopropylphenothiazine or aminopropyl-3-aminophenothiazine.

12. Lubricating compositions according to one of claims 2, 3 or 1, characterized in that the copolymer containing vicinal carboxylic groups is obtained by copolymerization or grafting of an unsaturated alpha,-beta-dicarboxylic acid in diacid or anhydride form.

13. Lubricating compositions according to claim 12, wherein the unsaturated alpha,beta-dicarboxylic acid is maleic anhydride or a derivative thereof.

14. Lubricating compositions according to one of claims 2, 3 or 1, characterized in that the copolymer is obtained by copolymerization of a maleic anhydride derivative with at least one ester of an unsaturated monoacid or diacid.

15. Lubricating compositions according to claim 14, wherein the ester is chosen from $C_1-C_{22}$ (meth)acrylates, maleates or fumarates.

16. Lubricating compositions according to claim 15, wherein the ester is an industrial mixture of a number of $C_6-C_{15}$ (meth)acrylates.

17. Lubricating compositions according to claim 16, characterized in that the copolymer contains nitrogenous monomers and/or olefinic monomers.

18. Lubricating compositions according to claim 17, wherein the nitrogenous monomer corresponds to the general formula $$CH_2=CR_2-CO-Y-R_3-NR_4R_5 \quad (II)$$

where
$R_2$ is the hydrogen atom or the methyl radical
Y denotes an oxygen or sulphur atom or the —NH— group
$R_3$ is a $C_2-C_6$ alkylene group
$R_4$ and $R_5$, which are identical or different, are alkyl, cycloalkyl, alkylaryl or aryl radicals, preferably methyl or ethyl.

19. Lubricating compositions according to claim 18, wherein the nitrogenous monomer of general formula (II) is chosen from N,N-dimethylaminopropylmethacrylamide, N,N-diethylaminopropylmethacrylamide, N,N-dimethylaminoethylmethacrylamide, N,N-diethylaminoethylmethacrylamide, N,N-dimethylaminoethyl methacrylate and N,N-diethylaminoethyl methacrylate.

20. Lubricating compositions according to claim 17, wherein the nitrogenous monomer is chosen from vinylpyridines and vinylpyrrolidones.

21. Lubricating compositions according to claim 17, wherein the olefinic monomer corresponds to the general formula $$CH_2=CZ_1Z_2 \quad (III)$$

where $Z_1$ and $Z_2$, which are identical or different, denote hydrogen, a $C_1-C_{30}$ saturated, unsaturated or aromatic hydrocarbon radical, a halogen such as fluorine, chlorine or bromine, an —O—CO—R' group (where R' is a $C_1-C_3$ alkyl radical) or an —OR" group (where R" is a $C_1-C_{12}$ alkyl radical).

22. Lubricating compositions according to claim 21, wherein the olefinic monomer of general formula (III) is chosen from ethylene, alpha-olefins, vinyl chloride, 1,1-dichloroethylene, styrene or its derivatives, vinyl ethers and vinyl esters.

23. Lubricating compositions according to claim 14, wherein the copolymer contains 20 to 99% by weight of (meth)acrylic esters, 0.1 to 10%, of maleic anhydride, 0 to 10%, of an olefinic monomer and 0 to 10%, of a nitrogenous monomer, and its weight-average molecular mass is between 20,000 and 500,000.

24. Lubricating compositions according to claim 12, wherein the copolymer containing vicinal carboxylic groups is obtained by grafting an unsaturated alpha,-beta-dicarboxylic acid or a maleic anhydride derivative onto a hydrocarbon polymer or a poly(meth)acrylate.

25. Lubricating compositions according to claim 24, wherein the hydrocarbon polymer is an ethylene copolymer containing 15 to 90% by weight, of ethylene, 0 to 20% by weight of a linear or cyclic unconjugated diene chosen from 1,4-hexadiene, 2-methyl-1,4-pentadiene, 1,4-cyclopentadiene, 1,5-cyclooctadiene and norbornene derivatives from the group consisting of 5-methylene-2-norbornene, the remainder originating from at least one $C_3-C_{24}$ alpha-olefin such as propylene, butene, pentene, heptene, octene, nonene, decene, 4-methylpentene or 5-methylpentene.

26. Lubricating compositions according to claim 25, wherein the ethylene copolymer is an ethylene-propylene copolymer.

27. Lubricating compositions according to claim 25, wherein the ethylene copolymer has a weight-average molecular mass of between 20,000 and 500,000, and a polydispersity of less than 10.

28. Lubricating compositions according to claim 24, wherein the hydrocarbon polymer is a diene copolymer prepared by copolymerization of two diolefins, from the group consisting of butadiene, isoprene and 2,2-dimethylbutadiene or by copolymerization of one of these diolefins with styrene.

29. Lubricating compositions according to claim 24, wherein the hydrocarbon polymer is a diene homopolymer, from the group consisting of polymers of butadiene, isoprene and 2,3-dimethylbutadiene.

30. Lubricating compositions according to claim 24, wherein the hydrocarbon polymer is a $\geq C_4$ alpha-olefin homopolymer.

31. Lubricating compositions according to claim 24, wherein the poly(meth)acrylates are prepared by polymerization of a mixture of $C_1$–$C_{21}$ esters of (meth)acrylic acid.

32. Lubricating compositions according to claim 24, characterized in that the hydrocarbon polymers or the (meth)acrylates contain a nitrogenous monomer, from the group consisting of the monomers of general formula (II) vinylpyridines and vinylpyrrolidones.

33. Lubricating compositions according to one of claims 2, 3 or 1, characterized in that the condensation of the primary or secondary amine and/or of the alkylenepolyamine of general formula (I) with the copolymer containing vicinal carboxylic acid functional groups is carried out in an organic solvent or in an oil at a temperature of between 90° and 170° C. for 3 to 8 hours, using 0.5 to 2 mole, of alkylene polyamine and optionally 0.2 to 1 mole of primary or secondary amine per vicinal carboxylic acid functional groups of the copolymer.

34. Concentrated lubricating compositions containing 15 to 50% by weight of at least one additive according to claim 1.

35. Compositions according to claim 1, containing other conventional additives for lubricants selected from the group consisting of corrosion inhibitors, detergents and antiwear, dispersant and antifoam additives.

36. Compositions according to claim 35, containing 0.2 to 15% of at least one of said additives resulting from said condensation.

* * * * *